July 29, 1969     W. B. NOE     3,458,237
SOLID PARTICULATE METERING SYSTEM
Filed Aug. 29, 1967
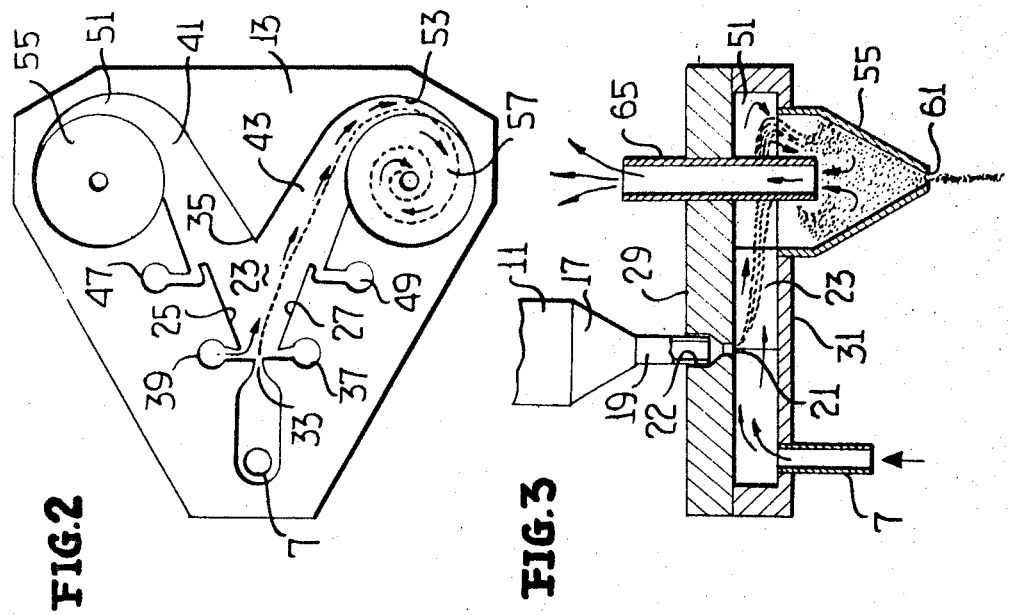
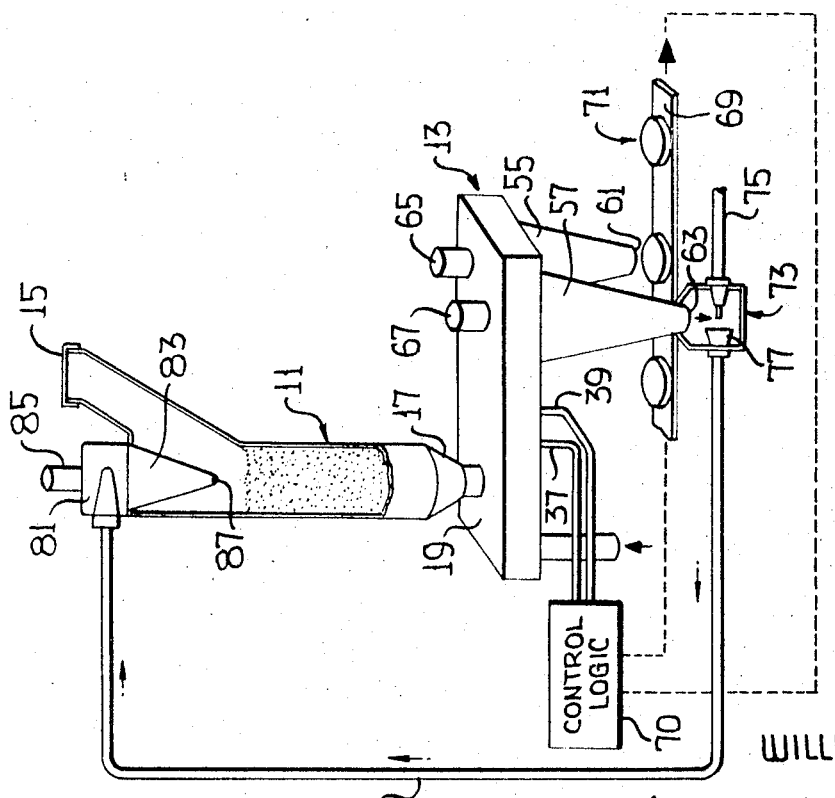
INVENTOR
WILLIAM B. NOE
BY Hurvitz, Rose & Greene
ATTORNEYS

United States Patent Office 3,458,237
Patented July 29, 1969

3,458,237
SOLID PARTICULATE METERING SYSTEM
William B. Noe, Annandale, Va., assignor to Melpar, Inc., Falls Church, Va., a corporation of Delaware
Filed Aug. 29, 1967, Ser. No. 664,038
Int. Cl. B65g 53/16, 53/42; F15c 1/14
U.S. Cl. 302—28                                                10 Claims

ABSTRACT OF THE DISCLOSURE

A solid particulate metering system comprising a fluidic switching element having a gas power stream laden with solid particulates which is deflected towards either of two output passages in accordance with timing control logic; the output passages communicating with respective vortex separators within which the solid particulates are separated from the high velocity gas. At one of the vortex separators the solid particulates are discharged to a receiver carried by a conveyor belt; the particulates discharged by the other vortex separator are aspirated to a particulate reservoir from which they are re-immersed in the power stream.

BACKGROUND OF THE INVENTION

The present invention relates to an apparatus and method for handling and metering solid particulates such as grain, cement, sand, powdered explosives, and the like. More particularly, the present invention relates to controlling the conveyance of solid particulates in a fluid stream. Although the invention is particularly advantageous when employed in loading explosives, it should not be construed as being limited thereto.

Prior art techniques for conveying, controlling and collecting solid particulates involve either hand or mechanical operation, the latter involving mechanisms having moving parts. For many applications, loading or collecting particulates by hand is too slow and inaccurate, and further is highly dangerous where the particulates are explosive. The danger arises not only from possible explosion but also from skin burns resulting from direct contact. Mechanical loaders and conveyors of particulates generally require moving mechanical elements which either block or shunt particulate flow from a metering orifice during a loading operation. Such devices introduce inaccuracies because of intermittent particulate flow through orifices, and are slowed by the inertia of the moving parts. Further, where explosives are being loaded, there is a substantial risk of accidental detonation resulting from the frictional engagement of moving parts.

It is therefore an object of the present invention to provide a method and apparatus for controlling the loading of solid particulates in a safer, quicker, and more accurate manner than has heretofore been possible.

It is another object of the present invention to provide a solid particulate metering system having no moving parts and which requires no human exposure to the metered particulate.

It is still another object of the present invention to provide a highly accurate solid particulate metering system which can be controlled from a remote location.

It is still a further object of the present invention to provide a solid particulate metering system capable of loading particulate charges having weights on the order of a few milligrams at a rate of at least 60 times per minute.

SUMMARY OF THE INVENTION

The system of the present invention comprises a fluidic switching device employed in conjunction with a pair of vortex separators (as, for example, disclosed in U.S. Patent 3,195,241) communicating with the output passages of the switching device. A gaseous power stream in laden with the particulates to be metered and is deflected by one or more control streams toward one or the other of respective output passages of the fluidic switching element. When the power stream is received by a first of the output passages it is directed to a vortex separator wherein the solid particulates are separated from the high velocity gas and are deposited in a suitable receiver. The gas is exhausted from the vortex separator in a direction opposite from the direction in which the particulates proceed. When the power stream is directed to the other output passage, it is received by another vortex separator which discharges the particulates into an aspirator chamber from which they are conveyed by another fluid stream to a storage reservoir and subsequently re-immersed into the gaseous power stream. By controlling the incidence of power stream switching between the two output passages of the fluidic switching element, particulate loading may be quickly and accurately accomplished. The switching of the power stream is accomplished by controllable streams of fluid which impact against the power stream. These control streams are generated at appropriate fluidic logic circuitry in timing sequence dictated by the system loading requirements.

The fluidic particulate metering system of the present invention employs no moving parts and can be more quickly and accurately operated than prior art systems requiring hand operation or mechanical elements employing moving parts. In addition, if high explosive particulates are to be employed, the absence of frictionally engaging surfaces avoids the possibility of sparking and excessive uneven hot points in the system so that the particulates may be loaded with much greater safety than has been heretofore possible.

The above and still further objects, features and advantages of the present invention will become apparent upon consideration of the following detailed description of one specific embodiment thereof, especially when taken in conjunction with the accompanying drawing.

BRIEF DESCRIPTION OF THE DRAWINGS

FIGURE 1 is a view in perspective of the solid particulate metering system of the present invention;

FIGURE 2 is a plan view of the fluidic switching element (without its top wall) employed in the solid particulate metering system of the present invention; and FIGURE 3 is a side view in partial section of the switching element employed in the present invention, illustrating its relationship with a vortex separator connected to the output passages of the switching element.

DESCRIPTION OF THE PREFERRED EMBODIMENTS

Referring now specifically to FIGURES 1–3, there is illustrated a solid particulate metering system constructed in accordance with the principles of the present invention. A cylindrical reservoir 11 is mounted immediately above a fluidic switching device 13. The term "fluidic" as employed herein refers to the class of devices sometimes referred to as "pure fluid" devices, wherein a fluid stream is deflected by means of wall attachment and/or stream interaction, there being no mechanical moving parts involved. Reservoir 11 has a loading port 15 at its upper end, through which solid particulates may be received. The bottom of reservoir 11 terminates in a funnel-shaped section 17 which in turn terminates in a cylindrical feed tube 19 extending through an aperture 22 in the top wall 29 of fluidic switching element 13. The lower end of feed tube 19 abuts a sloping shoulder in aperture 22 (reference FIGURE 3) which narrows to a feed orifice 21 of substantially smaller cross-section than feed tube 19 and which is sufficiently small to permit a determinable rate of particulate flow therethrough.

Internally of switching element 13 an interaction chamber 23 is defined by opposing sidewalls 25 and 27 of switching element 13 and by upper and lower walls 29 and 31 respectively. A power nozzle 33 and a flow divider 35 are disposed at respective ends of the chamber. Metering orifice 21 is located in substantial alignment and intermediate of power nozzle 33 and flow divider 35. Power nozzle 33 receives a source of low pressure air (for example 1 to 3 inches of water) and as a result issues a power stream of air into interaction chamber 23. Metering orifice 21, being aligned with the exit plane of the power nozzle 33 at a short distance downstream thereof discharges the particulates from reservoir 11 into the power stream which acts to accelerate particulate flow in the direction of power stream flow. A pair of control nozzles 37 and 39 communicate with interaction chamber 23 in opposing relation through respective sidewalls 27 and 25. Sidewalls 25 and 27 gradually diverge in a downstream direction and are located sufficiently proximate the power stream as to enable the power stream lock-on to either sidewall. A pair of output passages 41 and 43 communicate with the downstream end of interaction chamber 23 on opposite sides of flow divider 35, the passages being defined by respective extensions of sidewalls 25 and 27 and divergent walls of V-shaped divider 35. A pair of vent ports 47 and 49 communicate between respective ones of output passages 41 and 43 and ambient pressure.

The operation of switching element 13 is as follows: The fluid stream issuing from power nozzle 33 is initially directed toward the apex of flow divider 35. In passing through chamber 23, the fluid stream entrains and thereby removes fluid therefrom. The element 13 is constructed substantially symmetrical with respect to a central axis extending longitudinally through the center of power nozzle 33 toward flow divider 35. However, due to inevitable slight asymmetries or slight pressure perturbations, the issued power stream will be slightly closer to one sidewall than the other, thereby tending to entrain and remove fluid between the power stream and that sidewall to a greater extent than the fluid between the power stream and the other sidewall. Thus, for example, if the power stream issues from nozzle 33 so as to be slightly closer to sidewall 25, the pressure in the region between the power stream and sidewall 25 becomes lower than the pressure between the power stream and sidewall 27, and a pressure differential is set up across the power stream tending to deflect it to sidewall 25. As the power stream is deflected further toward sidewall 25 it becomes even more efficient in entraining air in the vicinity of that sidewall and the pressure in this region is further reduced. This action is self-reinforcing and results in the power stream being deflected into contact with sidewall 25 and entering output passage 41. The power stream is maintained adjacent sidewall 25 by this pressure differential, the phenomena being referred to as boundary layer lock-on. The stream remains directed to output passage 41; that is, locked on at sidewall 25 until deflected by an appropriate control stream of sufficient pressure to overcome the lock-on pressure. Upon occurrence of such control stream at control port 39, the power stream is, in fact, deflected towards side wall 27 and is locked on thereto in a similar manner so as to have the power stream directed toward output passage 43. Output passages 41 and 43 curve so as to merge with the wall of cylindrical chambers 51 and 53, respectively, so that fluid conducted by the output passages enters respective chambers 51 and 53 tangentially and vortical flow is induced therein.

Output passages 41 and 43 terminate in respective cylindrical chambers 51 and 53 which communicate with the inlets of respective vortex separators 55 and 57 through approximately defined apertures in bottom wall 31 of the switching element 13. Fluid flowing in either of passages 41 and 43 has vortical motion imparted thereto by the walls of chambers 51 and 53.

The vortex separators comprise conical chambers having their inlets at their open wider ends. The vortical flow received from chambers 51 and 53 enters the vortex separators at said inlets. Considering vortex separator 55 along (as vortex separtor 57 is identical therewith) the separator extends downwardly and terminates in discharge port 61 which is of substantially smaller cross-section than the inlet mouth of the separator. An exhaust tube extends coaxial with and upward from the interior of the separator, through cylindrical chamber 51 and top wall 29 of switching element 13. Exhaust tube 65 communicates with ambient pressure and accordingly serves to discharge the pressurized gas from vortex separator 55. Specifically, as the particulate laden stream is directed to output passage 41, its axially directed flow is converted to vortical flow by the chamber 51. The rotating or vortical flow in chamber 51 is conducted to separator 55 which narrows in a generally funnel shaped configuration so as to increase the vortical angular velocity as the fluid approaches port 61 and build up a pressure in the lower portion of the separator. This higher pressure causes the gas to be discharged to ambient via exhaust port 63, but the heavier particulates are separated out and are discharged from discharge port 61.

Positioned immediately below discharge port 61 of vortex separator 55 is a conveyer belt 69 upon which a plurality of spaced particulate receivers 71 are disposed. The translation of conveyer belt 69 is synchronized to the switching of the power stream of switching element 13 by external control logic, designated generally as 70, so that upon each loading operation (that is after the power stream has been removed from output passage 41) the belt 69 is stepped an appropriate distance to position the next sequential receiver 71 beneath the discharge port 61.

The vortex separator 57 has its discharge port 63 extending into an enclosed aspirator chamber 73. Communicating in aligned relation with respective opposing ends of aspirator chamber 73 are aspirator inlet nozzle 75 and aspirator receiving passage 77. Aspirator inlet nozzle 75 communicates with a low pressure source of air and thereby issues a stream into chamber 73. Discharge port 63 is disposed intermediate and above aspirator inlet 75 and receiver 77 so that the particulates discharged by port 63 are entrained in the fluid stream issuing from inlet 75 and directed to receiver 77. Receiver 77 in turn communicates with return line 79 which is a fluid conduit connected between receiver 77 and reservoir 11. Specifically, return line 79 communicates with the inlet 81 of vortex separator 83 disposed at the top of reservoir 11. The stream of particulate laden air enters inlet 81 tangentially and is thereby converted to a vortical flow. Vortex separator 83 is substantially identical to vortex separators 55 and 57 described above and the principles of operation need not be repeated. Suffice it to say that the air from the aspirator stream is exhausted through exhaust vent 85 and the particulates are separated from the aspirating stream and discharged at discharge port 87 into the particulate supply in the reservoir 11. The particulates are thus recycled and are ready for re-immersion in the power stream.

The operation of the system may now be readily understood. Solid particulates in reservoir 11 are discharged into the power stream issued by power nozzle 33 and directed to output passages 41 and 43 as a function of the logic signals received at control ports 37 and 39. When the power stream is directed to output passage 41, the particulates are separated from the power stream at vortex separator 55 and are discharged via discharge port 61 to an appropriate receiving element 71 on conveyer belt 69. When the power stream is switched to output passage 43 by a signal at control port 39, the loading of receiver 71 ceases and the particulates are separated from the power stream in vortex separator 57 and returned to reservoir 11 by the action of aspirator chamber 73 and vortex separator 81. During the period in which the power stream is removed from output passage 41, the conveyor belt is advanced so as to dispose the next sequential receiver 71 beneath vortex separator 55. When the conveyer belt is properly positioned, the power stream is switched again by means of a control signal at a control port 37 and the power laden stream is directed towards vortex separator 55 to load the receiver 71.

The period of time during which the power stream is directed toward output passage 41 (loading operation) is determined solely by the control logic external to the system as thus far described. Such control logic preferably comprises fluidic components such as counters and the like which are conventional and therefore are not described in detail. The time interval during which the power stream is to be maintained locked-on to sidewall 25 depends, of course, on the rate at which particulates are delivered to the power stream from the reservoir and on the quantity of particulates to be loaded in the reservoir and on the quantity of particulates to be loaded in any one receiver. Similarly, the time interval during which the power stream is to remain locked-on to sidewall 27 depends upon the time required to re-position an empty receiver under discharge port 61. Conventional fluidic logic circuitry 70 can readily be designed to automatically apply control pulses at ports 37 and 39 in accordance with these requirements.

A possible modification of the system as described above would involve the utilization of a monostable fluidic switching element in place of bistable fluidic element 13. Specifically, if sidewall 25 were recessed sufficiently far from the central axis of switching element 13, the power stream would issue from output passage 41 only in the presence of an input control signal at control port 37 sufficient to overcome the boundary layer effects at sidewall 27. In the absence of such signal, the power stream would revert and lock-on to sidewall 27. The advantage of the monostable element lies in the fact that failure of a control signal could not result in overloading a particular one of the receivers 71 since in the absence of a control signal the particulate laden power stream is recirculated through back to reservoir 11 via the aspirating channel comprising vortex separator channel 55, aspirator chamber 73, return line 79, and vortex separator 81. This overloading prevention feature may be particularly advantageous where the particulate being loaded is an explosive substance. Other fluidic elements may similarly be employed in place of element 13 in accordance with the particular application.

The system as described above comprises an all pneumatic continuous flow automated particulate metering system in which all the sequential operations may be synchronized through fluidic control. A fluidic switching element provides sampling of a particulate laden stream and it does so without employing moving parts. The amount of solids collected is a function of the sampling time, which is determined by the fluidic logic elements controlling the metering system. Thus, solid particulates are diverted into a collection channel during a sampling period and diverted into an alternate aspirating passage when not sampled. Material collected in the alternate passage is aspirated back to the reservoir and ultimately recycled through the system.

While I have described and illustrated one specific embodiment of my invention, it will be clear that variations of the details of construction which are specifically illustrated and described may be resorted to without departing from the spirit and scope of the invention as defined in the appended claims.

I claim:
1. A system for conveying controlled quantities of solid particulates from a reservoir to a receiver comprising:
   a fluidic switching element comprising means for issuing a power stream of fluid, at least two output passages, and means for selectively deflecting said power stream toward either of said two output passages;
   means for conveying said particulates from said reservoir to said switching element and for immersing said particulates in said power stream for translation therewith, the rate of particulate immersion in said power stream as a function of time being predetermined; and
   vortex separator means responsive to power stream flow in one of said output passages for separating said particulates from said fluid and for discharging said particulates to said receiver in one direction and discharging said fluid in another direction.

2. The system according to claim 1 further comprising:
   further vortex separator means responsive to power stream flow in the other of said at least two output passages for separating said particulates from said fluid and from discharging said particulates; and
   aspirator means responsive to discharge of particulates from said further vortex means for conveying said particulates to said reservoir.

3. The system according to claim 2 further comprising:
   a movable conveyor device;
   a plurality of receivers for said particulates, said receivers being spaced along said movable conveyor device; and
   logic means for operating said means for selectively deflecting in synchronism with said movable conveyor to sequentially position different ones of said receiver in receiving relation with particulates discharged from said vortex separator means each time said power stream is deflected toward said one of said output passages.

4. The system according to claim 2 wherein said aspirator means comprises:
   means for issuing a further stream of fluid for entraining particulates discharged from said further vortex separator means;
   means for conveying said further stream of fluid and the entrained particulates to said reservoir; and
   means for separating said entrained particulates from said further stream and discharging said particulates to said reservoir.

5. The combination according to claim 4 wherein said means for separating comprises a vortex separator.

6. The system according to claim 2 wherein said fluidic switching element is monostable, said power stream being stable when directed toward said other of said two output passages.

7. A system conveying solid particulates to a receiver comprising:
   means for issuing a particulate-laden stream of fluid;
   fluidic switching means, having a pair of passages, for selectively deflecting said particulate-laden fluid stream to either of said passages;
   means responsive to flow of said particulate-laden stream in one of said passages for imparting vortical flow to said stream;
   vortex separator means responsive to said vortical flow for separating said particulates from said fluid and for discharging said particulates to said receiver;
   means responsive to flow of said particulate-laden stream in the other of said passages for imparting vortical flow to said stream;
   further vortex separator means responsive to vortical flow imparted by said last mentioned means for separating said particulates from said fluid and for discharging said particulates;
   means for issuing a further fluid stream for entraining the particulates discharged by said further vortex separator means; and
   means for conveying said further fluid stream and the particulates entrained thereby to said means for issuing a particulate-laden fluid stream.

8. The system according to claim 7 further comprising:
a movable conveyor device;
a plurality of receivers for said particulates, said receivers being spaced along said movable conveyor device; and
logic means for operating said fluidic switching means in synchronism with said movable conveyor device to sequentially position different ones of said receivers in receiving relation with particulates discharged from the first mentioned of said vortex separator means each time said particulate-laden stream of fluid is deflected toward said one of said output passages.

9. The method of conveying solid particulates from a reservoir thereof to a receiver comprising the steps of:
immersing said particulates in a stream of fluid;
selectively deflecting said stream of fluid having particulates immersed therein to either of two fluid passages;
imparting vortical flow to fluid received by one of said passages;
separating said particulates from said vortical flow;
discharging particulates thus separated to said receiver;
imparting vortical flow to fluid received by the other of said fluid passages;
separating said particulates from said last-mentioned vortical flow;
entraining said particulates thus separated in a further fluid stream;
conveying said further fluid stream and said entrained particulates to said reservoir; and
separating said entrained particulates from said further fluid stream and discharging said separated particulates to said reservoir.

10. The method according to claim 9, further comprising the steps of:
sequentially positioning a plurality of particulate receivers in receiving relationship with particulates discharged from said first-mentioned vortical flow; and
synchronizing deflection of said stream of fluid and positioning of said particulate receivers such that said stream of fluid is deflected into said one of said two fluid passages each time a particulate receiver is moved into receiving relationship with discharged particulates.

References Cited

UNITED STATES PATENTS

| 2,889,856 | 6/1959 | Magnuson | 302—28 |
| 3,016,063 | 1/1962 | Hausmann | 137—81.5 |
| 3,195,241 | 7/1965 | Hohtne | 34—10 |

FOREIGN PATENTS

| 472,968 | 4/1951 | Canada. |

ANDRES H. NIELSEN, Primary Examiner

U.S. Cl. X.R.

137—81.5; 302—42